(12) United States Patent
Exton et al.

(10) Patent No.: US 8,250,627 B2
(45) Date of Patent: Aug. 21, 2012

(54) TRANSACTION AUTHORIZATION

(75) Inventors: Scott Anthony Exton, Ormeau Hills (AU); Benjamin Brewer Harmon, Santa Cruz, CA (US); Christopher John Hockings, Burleigh Waters (AU); Paul William Jensen, Mermaid Beach (AU)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 12/180,903

(22) Filed: Jul. 28, 2008

(65) Prior Publication Data

US 2010/0023454 A1 Jan. 28, 2010

(51) Int. Cl.
*G06F 7/04* (2006.01)
*G06F 9/00* (2006.01)
*H04L 29/06* (2006.01)
*H04L 9/32* (2006.01)

(52) U.S. Cl. ............... 726/2; 726/9; 726/10; 726/12; 726/20; 713/153; 713/159; 713/181

(58) Field of Classification Search ............ 726/2, 9, 726/10, 12, 20; 713/153, 159, 181
See application file for complete search history.

(56) References Cited

U.S. PATENT DOCUMENTS

| | | | |
|---|---|---|---|
| 5,343,529 A | 8/1994 | Goldfine et al. | |
| 6,915,430 B2 * | 7/2005 | Wheeler et al. | 713/170 |
| 7,187,771 B1 * | 3/2007 | Dickinson et al. | 380/228 |
| 7,373,515 B2 * | 5/2008 | Owen et al. | 713/182 |
| 2007/0044146 A1 * | 2/2007 | Murase et al. | 726/10 |

FOREIGN PATENT DOCUMENTS

WO 2007068525 A1 6/2007

OTHER PUBLICATIONS

"IBM Tivoli Access Manager for e-Business", Mar. 2008, IBM Corporation, pp. 1-6.

* cited by examiner

*Primary Examiner* — Mohammad W Reza
(74) *Attorney, Agent, or Firm* — Yee & Associates, P.C.; John D. Flynn

(57) ABSTRACT

One embodiment provides a computer-implemented method for transaction authorization within a security service. The computer-implemented method intercepts a request by a security service, wherein a transaction identifier is cached to form a cached transaction identifier, and requests the requester to authenticate to form an authentication request. The computer-implemented method further determines whether the requester was authenticated, and responsive to a determination the requester was authenticated, receives authentication information, including an associated transaction identifier. The request is intercepted and the cached transaction identifier inserted. The computer-implemented method further determines whether the cached transaction identifier is equivalent to the authentication information, including an associated transaction identifier, and responsive to a determination that the cached transaction identifier is equivalent to authentication information, including an associated transaction identifier, passes the request to the application.

19 Claims, 3 Drawing Sheets

TRANSACTION AUTHORIZATION

BACKGROUND OF THE INVENTION

1. Field of the Invention

The present invention relates generally to an improved data processing system and, more specifically, to a computer-implemented method, a data processing system, and a computer program product for transaction authorization.

2. Description of the Related Art

A typical use case involves a user attached to a network, where the user opens a browser and authenticates to a system by providing a username and an associated password. The user, a customer of a financial service, then wants to transfer funds to an external account. The funds transfer operation is considered a sensitive operation since the money transfer will be sent beyond the bank's infrastructure. The bank has implemented a policy requiring the user to authenticate again in order to prove that the same user is still using the browser, before executing the sensitive transaction.

This authentication may use a different authentication mechanism or method than the one originally used to gain access to the system, such as biometric data in combination with the username and password. Each sensitive transaction requires the user to authenticate so the authentication event must be valid for only the single transaction being processed. Additional sensitive transactions will need to be individually authenticated at the time that the transactions are requested. Once the authentication is complete, without an intervening operation occurring in the meantime, the transaction can be authorized and processed by the application.

In this example, transaction authorization refers to the process of intercepting a transaction request, authenticating the user, and subsequently authorizing the transaction, all within a tamper-proof environment. For atomic transactions in a web environment, the fundamental requirements include that a single authentication event has been performed immediately prior to the authorization event, and ensuring that the transaction contents have not been modified after the authentication has been performed. Enforcing that the transaction contents have not been modified ensures that the final transaction processed is the transaction that has been authenticated.

A number of existing methods have been used to attempt to satisfy the transaction authorization requirement, including use of an application tier. Current solutions typically rely on the transaction authorization to be performed in the application tier itself. In this solution, a security service performs the initial authentication and course grained access control, but relies on the application itself to perform the operations required for transaction authorization. This method leads to authentication, authorization and audit implementations that are disjoint from the security service solution. In the case of post-event audit analysis, the reliance on the application approach makes retrospective analysis of transaction audit events more difficult.

In another example, a typical security service may authorize a request based on the resource being accessed, such as, "is this user permitted to access resource X?" This model is limited since there is no way to associate an exclusive authentication operation to a single request's lifecycle.

Current implementations also rely on re-authentication and step-up functions to implement the transaction authorization requirements. Re-authentication typically requires that the same authentication mechanism to be used during the re-authentication operation as was used during that user's original authentication. Step-up authentication requires a higher-level authentication mechanism be used, and the user's session then remains at the higher authentication level for the remainder of the session. In a hybrid model, the re-authentication and step-up authentication capabilities of the security service are leveraged to perform authentication. However, the application tier is responsible for implementing a method to maintain transaction integrity. The security service typically overloads re-authentication and step-up features, which have the restrictions noted previously. The hybrid model is also vulnerable to security exposures since there is no method for guaranteeing a single authentication operation is tied to a single transaction. Current implementations typically use timeout variables, and other information within cookies, to maintain state information across connections. However, it does not completely eliminate the chance of exploitation since the authentication operation is performed by another component. A solution that removes the deficiencies of the described approaches is required.

BRIEF SUMMARY OF THE INVENTION

According to one embodiment of the present invention, a computer-implemented method for transaction authorization within a security service is provided. The computer-implemented method intercepts a request by a security service, wherein a transaction identifier is cached to form a cached transaction identifier. The computer-implemented method further determines whether the requester was authenticated, and responsive to a determination the requester was authenticated, receives authentication information, including an associated transaction identifier. The computer-implemented method further determines whether the cached transaction identifier is equivalent to the authentication information, including an associated transaction identifier, and responsive to a determination that the cached transaction identifier is equivalent to authentication information, including an associated transaction identifier, passes the request with the cached transaction identifier in the request to the application.

In another embodiment, a data processing system for transaction authorization within a security service is provided. The data processing system comprises a bus, a memory connected to the bus, the memory comprising computer-executable instructions therein, a communications unit connected to the bus, a processor unit connected to the bus, wherein the processor unit executes the computer-executable instructions to direct the data processing system to intercept the request by a security service, wherein a transaction identifier is cached to form a cached transaction identifier, request the requester to authenticate to form an authentication request, determine whether the requester was authenticated, responsive to a determination the requester was authenticated, receive authentication information, including an associated transaction identifier, determine whether the cached transaction identifier is equivalent to the authentication information, including an associated transaction identifier, and responsive to a determination that the cached transaction identifier is equivalent to authentication information, including an associated transaction identifier, pass the request with the transaction identifier in the request to the application.

In another embodiment, a computer program product for transaction authorization within a security service is provided. The computer program product comprises computer-readable recordable type medium tangibly embodying computer-executable instructions thereon. The computer-executable instructions comprise computer-executable instructions for intercepting the request by a security service, wherein a transaction identifier is cached to form a cached transaction identifier, and computer-executable instructions for determining whether the requester was authenticated. The computer-executable instructions further comprise computer-executable instructions responsive to a determination the requester was authenticated, for receiving authentication information including an associated transaction identifier, computer-executable instructions for determining whether the cached transaction identifier is equivalent to the authentication information including an associated transaction identifier, and computer-executable instructions for, responsive to a determination that the cached transaction identifier is equivalent to authentication information transaction identifier, passing the request with the cached transaction identifier in the request to the application.

DETAILED DESCRIPTION OF THE INVENTION

Figure 1:
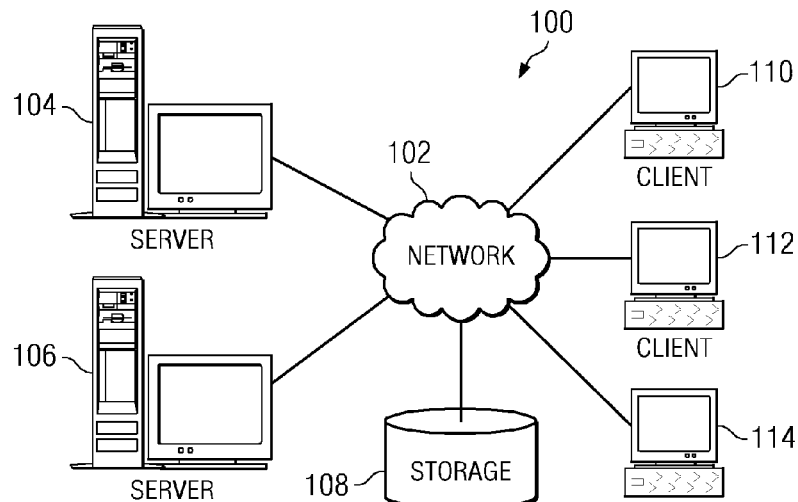
FIG. 1 depicts a pictorial representation of a network of data processing system in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper, or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture, including instruction means, which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process such that the instructions which execute on the computer, or other programmable apparatus, provide processes for implementing the functions/acts specified in the flowchart and/or block diagram block or blocks.

Figure 2:
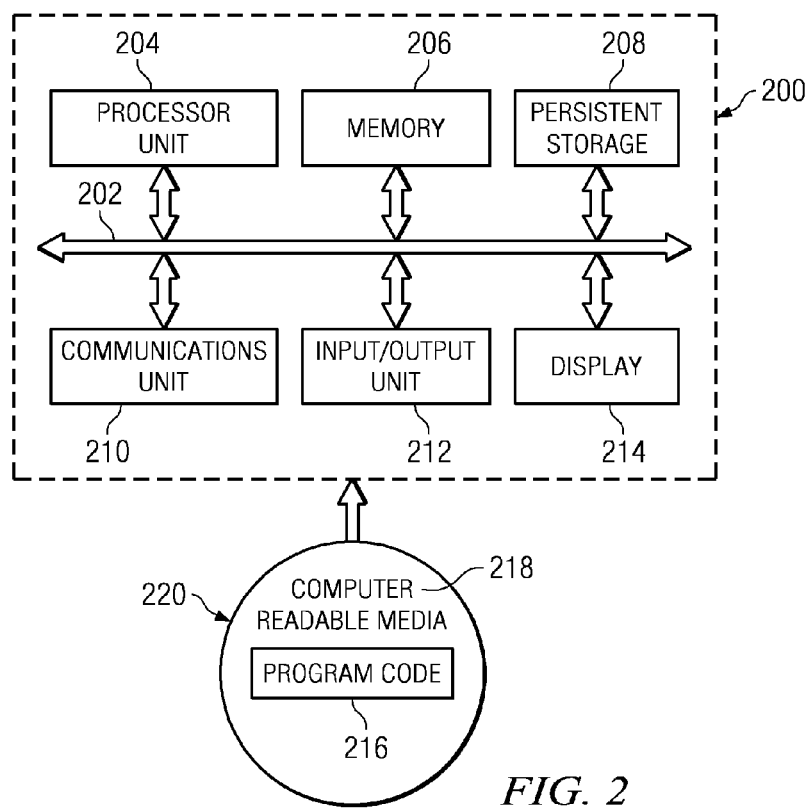
FIG. 2 is a block diagram of a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102, along with storage unit 108. In addition, clients 110, 112, and 114 connect to network 102. Clients 110, 112, and 114 may be, for example, personal computers or network computers. In the depicted example, server 104 provides data, such as boot files, operating system images, and applications, to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example and not as an architectural limitation for the different illustrative embodiments.

For example, using system 100 of FIG. 1, a security service on server 104 implements the requirements of transaction authorization. In the example, a method is provided for authorizing a single hypertext transport protocol (HTTP) request from client 110 received through network 102, having guaranteed the authentication conditions. The security service assumes responsibility for the entire transaction validation process and is implemented as a separate component. The security service is responsible for authentication, access control, and audit of all access to the applications. The security service may be implemented in alternative implementations including a web server with a security plug-in, or a dedicated reverse proxy server.

The security service intercepts the initial transaction request between client 110 and an application that contains the transaction information, which includes a unique transaction identifier of the application, located on server 106, used to identify the request. The method allows the authentication operation to be implemented using any authentication method or mechanism possibly involving a third-party authentication service, which can also be on another separate system. The authentication operation is ensured to only be valid for the lifetime of a single transaction authorization, and guarantees that the initiated transaction request is the transaction request that was authenticated through the use of an authorization decision. If a new transaction begins within the user's session, a new, unique transaction identifier is generated, which forces the authorization decision to fail and subsequently, drives a request for a new authentication operation. The authorized request is returned from the security service to the application for processing.

With reference now to FIG. 2, a block diagram of a data processing system is shown, in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors, or may be a multi-processor core, depending on the particular implementation. Further, processor unit 204 may be implemented using one or more heterogeneous processor systems, in which a main processor is present, with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information, either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system, applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto, or transferred to, data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system, including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
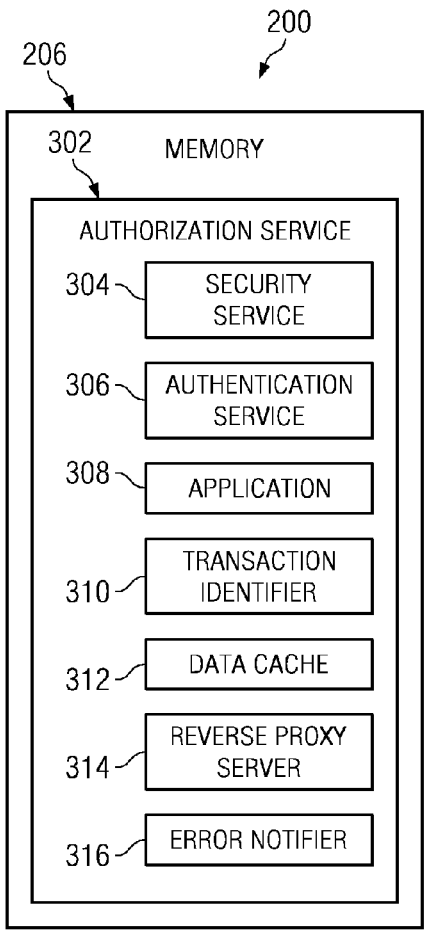
FIG. 3 is a block diagram of components of an authorization service, in accordance with illustrative embodiments.

With reference to FIG. 3, a block diagram of components of an authorization service, in accordance with illustrative embodiments is shown. Authorization service 302 is shown within memory 206 of system 200 of FIG. 2. Authorization service 302 may also be configured and maintained in other memory locations, such as persistent storage 208, until required for installation and use.

Authorization system 302 is a combination of components or modules comprising security service 304, authentication service 306, application 308, transaction identifier (transID) 310, data cache 312, reverse proxy server 314, and error notifier 316. FIG. 3 depicting the components as separate entities is not meant to be limiting because the components may be implemented in various combinations to achieve the same effect.

Security service 304 intercepts a sensitive transaction request from a user, or other component, for routing to authentication service 306. Security service 304 ensures the requester has an established session and also caches selected transaction information for use during the authentication process. Authentication service 306 performs the additional verification that the requester is permitted to perform the requested transaction. A sensitive transaction is a type of transaction, or an attribute of a transaction, that requires the request for processing of the transaction to be verified before processing. For example, in a currency transfer transaction, the user requesting the transaction must be verified as the user who is permitted to perform such transactions. Verification ensures that funds are not transferred by a user who is unauthorized to access the funds from the source or target accounts.

Application 308 is the component responsible for processing the sensitive transaction of the request. In the funds transfer example, application 308 would provide the financial transaction having access to a user's accounts for funds transfers. Application 308 also generates the transaction identifier associated with the transaction used to track the transaction.

Transaction identifier 310 is a unique identifier issued by an application for the purpose of tracking transactions. Transaction identifier 310 of the request must be the same for the duration of the request. Otherwise, an error would be raised and the transaction prevented from being processed. Transaction identifier 310 could be a simple numeric identifier, or other form deemed necessary by the owning application.

Data cache 312 is a data structure in a storage location used to temporarily maintain information used in the authorization sequence. Data cache 312 may be implemented in a suitable memory location for handling transient data in a time-responsive manner that is accessible to security service 304.

Reverse proxy server 314 is located between a user (or requester) and security service 304, authentication service 306, and application 308. Reverse proxy server 314 has the capability to route or redirect requests, such as when a request to perform a sensitive transaction occurs. Security service 304 may be implemented on reverse proxy server 314. In an alternative, security service 304 may also be implemented using a web server with a security plug-in.

Error notifier 316 provides a mechanism to send error-related information to a requester. For example, when authentication service 306 detects a problem with a transaction-related request, an error condition would be raised and the requester notified. In the example, when transaction identifier 310 is not consistent throughout the process of the sensitive transaction, an error condition is set and the requester is informed that the transaction cannot be completed as requested.

Figure 4:
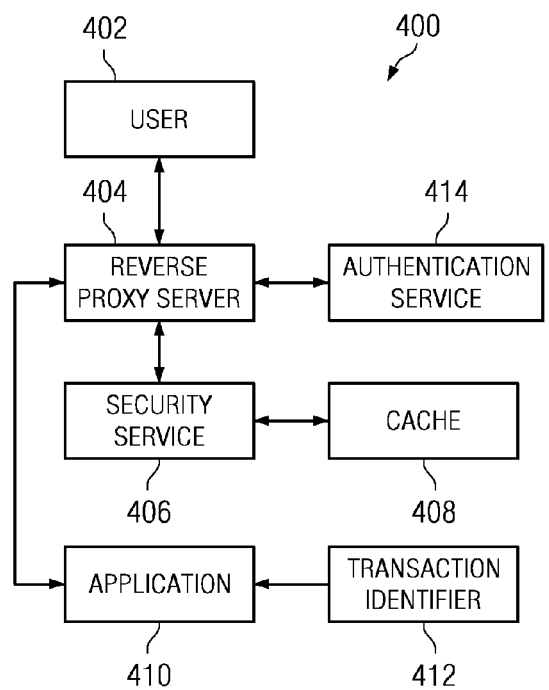
FIG. 4 is a block diagram of data flows using an authorization service, in accordance with illustrative embodiments.

With reference to FIG. 4, a block diagram of data flows using an authorization service, in accordance with illustrative embodiments is shown. FIG. 4 depicts an illustrative embodiment showing logical relationships and data flows between the various high-level components of authorization system 400.

User 402 submits a request to perform a sensitive transaction associated with application 410. The request is passed from user 402 to application 410 through reverse proxy server 404. Depending upon the request, reverse proxy server 404 may pass the request directly to application 410 or the request may be routed to security service 406 or authentication service 414. Reverse proxy server 404 may be replaced with a web server, with a security plug-in performing the functionally equivalent service.

For example, when user 402 logs in to authorization system 400, the log-in request is routed to security service 406 for processing. In this case, the request includes a username and a password. When user 402 initiates a request for a sensitive transaction, the request is intercepted by reverse proxy server 404, sent to security service 406, which caches a portion of the request, including transaction identifier 412 in cache 408. The user is redirected by security service 406 to authentication service 414 for sensitive transaction authentication. When successfully authenticated, a response is returned and routed through reverse proxy server 404 to application 410 for processing.

Figure 5:
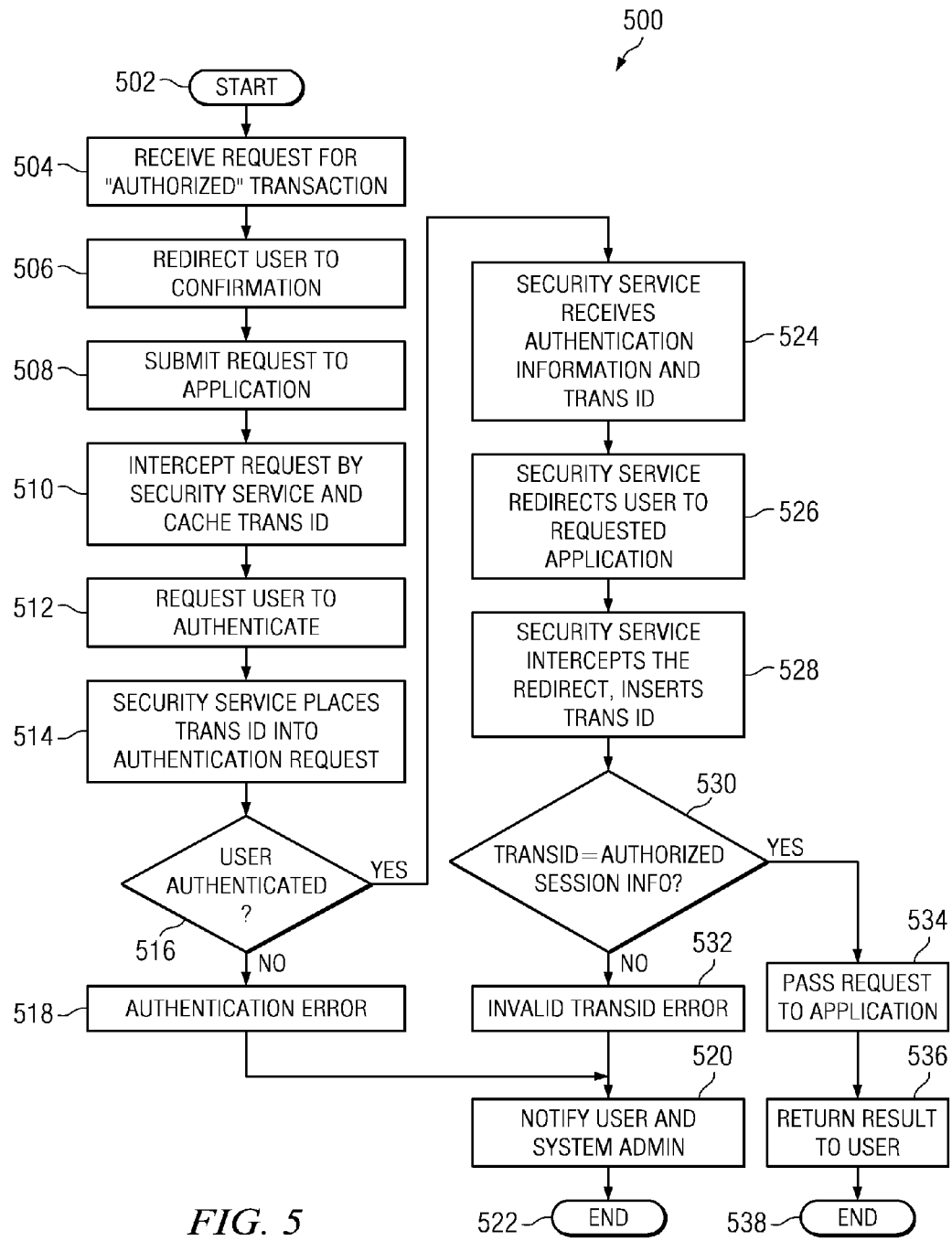
FIG. 5 is a flowchart of a process using authorization service of FIG. 3, in accordance with illustrative embodiments.

With reference to FIG. 5, a flowchart of a process using authorization service 302 of FIG. 3, in accordance with illustrative embodiments, is shown. Process 500 is an example of using authorization service 302 of FIG. 3. Process 500 depicts the process of authorizing a user request for a sensitive transaction that occurs after the user has established an authenticated session with security service 304 of FIG. 3.

Process 500 starts (step 502) and receives a request for an application, at a reverse proxy server, to process an authorized transaction (step 504). The authorized transaction is a sensitive transaction that has been initiated by a user, or other component requestor interacting with an application, capable of establishing and performing sensitive transactions. The application presents the transaction confirmation page of the application to the user (step 506). The user then submits the confirmed transaction request to the application, which may be an application universal resource locator (URL) for web-based applications that processes the request (step 508).

The confirmed transaction request is intercepted by the security service (step 510). The security service has an authentication policy in place which causes the security service to cache the content of the confirmed request, including the transaction identifier. The user is then prompted to authenticate, for the purpose of the sensitive transaction, with the authentication service (step 512). Each request the user makes to the authentication service passes through the security service component. The security service component extracts the transaction identifier from the cached data and inserts the transaction identifier into the authentication request sent to the authentication service (step 514).

A determination is made as to whether the user has been authenticated (step 516). If the user has been authenticated, a "yes" is returned. If the user has not been authenticated, a "no" results. When a "no" result is obtained in step 516, an authentication error is raised (step 518). A notification is provided to the user and/or a system administrator, or other parties, as required by the installation procedures (step 520), with process 500 terminating thereafter (step 522).

When a "yes" is obtained in step 516, the transaction identifier is passed back from the authentication service to the security service, and the security service component stores the transaction identifier along with the requesting user's authentication session (step 524). The security service then redirects the user request to the application (step 526). The redirection of the user is to the original universal resource locator of step 508.

In an alternative embodiment, when the response comes back from the security service, the proxy server (or in an optional embodiment a web server plug-in) could also extract the cached content at this stage and forward the request to the financial application. This implementation would remove the need for the redirect operation entirely. The alternative provides another option, rather than having the redirect as a part of the solution.

The redirect is again intercepted by the security service, which inserts the cached transaction identifier data from step 510 (step 528). The security service determines whether the transaction identifier in the cached data matches the transaction identifier in the user's authenticated session (step 530). When the transaction identifier and the session information are equivalent, a "yes" results. When the transaction identifier and the session information are not equivalent, a "no" results. When a "no" is obtained in step 530, an invalid transaction identifier error is raised (step 532). Notify the user and/or system administrator is then performed (step 520) as before and process 500 terminates thereafter (step 522)

When a "yes" is obtained in step 530, the request is passed to the application for processing (step 534). The result of processing is returned to the requester or user (step 536), with process 500 terminating thereafter (step 538).

In one illustrative embodiment, a security service implements the requirements of transaction authorization. In an example, a method is provided for authorizing a single hypertext transport protocol (HTTP) request, having guaranteed the authentication conditions. The security service assumes responsibility for the entire transaction validation process and is implemented as a separate component.

The security service intercepts the initial transaction request that contains the transaction information, which includes a unique transaction identifier the application uses to identify the request. The method allows the authentication operation to be implemented using any authentication method or mechanism, which may involve a third-party authentication service. The authentication operation is ensured to only be valid for the lifetime of a single transaction authorization, and guarantees that the initiated transaction request is the transaction request that was authenticated, through the use of an authorization decision. If a new transaction begins within the user's session, a new unique transaction identifier is generated which forces the authorization decision to fail, and subsequently drives a request for a new authentication operation.

The illustrative embodiment does not require re-authentication of the user by having the user authenticate with the same authentication mechanism the user used to begin the session. With regard to the previous step-up method, the illustrative embodiment does not cause the user to remain at the higher authentication level for the remainder of the session after the transaction authentication.

Illustrative embodiments use an authorization decision to couple the initial transaction request with the authentication operation, thereby ensuring that the transaction request has been authenticated. The coupling removes the need for potentially compromising methods for storing transaction details across the connections, such as cookies. All of the security features, such as authentication, authorization, and audit have been moved out of the application tier and placed into the security service. Placement within the security service removes the requirement for the application to perform complex security operations, instead leveraging the security service to perform the task. Application developers generally have little experience in implementing security functionality; therefore implementations of application provided security run a greater risk of having security vulnerabilities. Having the implementation in the security service, performed as a security activity, reduces this risk. The implementation within the security service allows customers to leverage existing security services comprising authentication and authorization policy, providing a more secure and more consistent enforcement implementation with regard to audit capability and policy.

In the example provided, a client may be a user with an internet browser. A web-based security service component may be viewed as a component of a security service that resides within a customer-defined network. The security service is responsible for authentication, access control, and audit of all access to the applications. The security service may be implemented as a web server with a security plug-in or a dedicated reverse proxy. A financial application is a typical example of an application having a capability for sensitive transactions. The application is the component that processes the transaction. Processing includes the initial setup, and final processing of the transaction. The authentication component is the component that performs authentication on behalf of the security service.

The flowchart and block diagrams in the figures illustrate the architecture, functionality, and operation of possible implementations of systems, methods, and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory, employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for transaction authorization within a security service, the computer-implemented method comprising:
    receiving a request, by a reverse proxy server, from a requestor for an authorized transaction of an application;
    presenting the requestor to a confirmation page of the application;
    submitting a confirmed transaction request to the application;
    intercepting by a computer the confirmed transaction request by the security service, wherein a transaction identifier is cached to form a cached transaction identifier;
    requesting by the computer the requestor to authenticate to form an authentication request;
    placing the cached transaction identifier into the authentication request;
    determining by the computer whether the requestor was authenticated;
    responsive to a determination the requestor authenticated, receiving authentication information-comprising an associated transaction identifier;
    determining whether the cached transaction identifier is equivalent to the authentication information; and
    responsive to a determination that the cached transaction identifier is equivalent to authentication information, passing the request with the cached transaction identifier in the request to an application.

2. The computer-implemented method of claim 1, wherein responsive to a determination the requestor authenticated further comprises:
    inserting the cached transaction identifier in the request.

3. The computer-implemented method of claim 1, wherein responsive to a determination the requestor is not authenticated, raising an authentication error, and notifying the requestor; and wherein responsive to a determination that the cached transaction identifier is not equivalent to authenticated session information of the requestor, raising an invalid transaction identifier error, and notifying the requestor.

4. The computer-implemented method of claim 1, wherein inserting the cached transaction identifier in the request further comprises one of:
   intercepting the request, inserting the cached transaction identifier into the request, forwarding of the request to the application by one of a reverse proxy server and a web server security plug-in; and
   redirecting the request to the application, intercepting the request, inserting the cached transaction identifier into the request; and forwarding of the request to the application by the security service.

5. The method of claim 1, wherein the request is associated with a transaction having the transaction identifier in a user session, and further comprising:
   responsive to the start of a subsequent transaction in the user session, said subsequent transaction causing any request using the cached transaction identifier to fail; and
   responsive to the attempted use of the cached transaction identifier failing, authenticating the subsequent transaction without use of the cached transaction identifier.

6. The method of claim 1, wherein the reverse proxy server comprises a security plug-in in a web server implementing a security service.

7. A data processing system for transaction authorization within a security service, the data processing system comprising:
   a bus;
   a memory connected to the bus, the memory comprising computer-executable instructions therein;
   a communications unit connected to the bus;
   a processor unit connected to the bus, wherein the processor unit executes the computer-executable instructions to direct the data processing system to:
   receive a request, by a reverse proxy server, from a requestor for an authorized transaction of the application;
   present the requestor to a confirmation page of the application;
   submit a confirmed transaction request to the application;
   intercept the request by the security service, wherein a transaction identifier is cached to form a cached transaction identifier;
   request the requestor to authenticate to form an authentication request;
   place the cached transaction identifier into the authentication request;
   determine whether a requestor was authenticated;
   responsive to a determination the requestor authenticated, receive authentication information comprising an associated transaction identifier;
   determine whether the cached transaction identifier is equivalent to the authentication information; and
   responsive to a determination that the cached transaction identifier is equivalent to the authentication information, pass the request with the cached transaction identifier in the request to an application.

8. The data processing system of claim 7, wherein the processor unit further executes the computer-executable instructions to direct the data processing system to be responsive to a determination the requestor authenticated further comprises:
   insert the cached transaction identifier in the request.

9. The data processing system of claim 7, wherein the processor unit further executes the computer-executable instructions to direct the data processing system to be responsive to a determination the requestor is not authenticated, raise an authentication error, and notify the requestor; and wherein the processor unit executes the computer-executable instructions to direct the data processing system to be responsive to a determination that the cached transaction identifier is not equivalent to authenticated session information of the requestor further comprises raise an invalid transaction identifier error, and notify the requestor.

10. The data processing system of claim 7, wherein the processor unit executes the computer-executable instructions to direct the data processing system to insert the cached transaction identifier in the request further comprises one of:
    intercept the request, insert the cached transaction identifier into the request, forward the request to the application by one of a reverse proxy server and a web server security plug-in; and
    redirect the request to the application, intercepting the request, inserting the cached transaction identifier into the request; and forward the request to the application by the security server.

11. The data processing system of claim 7, wherein the request is associated with a transaction having the transaction identifier in a user session, and wherein the processor unit further executes the computer-executable instructions to direct the data processing system to:
    responsive to the start of a subsequent transaction in the user session, said subsequent transaction causes any request using the cached transaction identifier to fail; and
    responsive to the attempted use of the cached transaction identifier failing, authenticate the subsequent transaction without use of the cached transaction identifier.

12. The data processing system of claim 7, wherein the reverse proxy server comprises a security plug-in in a web server implementing a security service.

13. A computer program product for transaction authorization within a security service, the computer program product comprising one or more computer-readable tangible storage devices:
    computer-executable instructions, stored on at least one of the one or more storage devices, for receiving the request by a reverse proxy server from a requestor for an authorized transaction of the application computer-executable instructions, stored on at least one of the one or more storage devices, for presenting the requestor to a confirmation page of the application;
    computer-executable instructions, stored on at least one of the one or more storage devices, for submitting a confirmed transaction request to the application;
    computer-executable instructions, stored on at least one of the one or more storage devices, for intercepting a request by the security service, wherein a transaction identifier is cached to form a cached transaction identifier;
    computer-executable instructions, stored on at least one of the one or more storage devices, for requesting a requestor to authenticate to form an authentication request;

computer-executable instructions, stored on at least one of the one or more storage devices, for placing the cached transaction identifier into the authentication request;

computer-executable instructions, stored on at least one of the one or more storage devices, for determining whether the requestor was authenticated;

computer-executable instructions, stored on at least one of the one or more storage devices, responsive to a determination the requestor authenticated, for receiving authentication information comprising an associated transaction identifier;

computer-executable instructions, stored on at least one of the one or more storage devices, for determining whether the cached transaction identifier is equivalent to the authentication information; and computer-executable instructions, stored on at least one of the one or more storage devices, responsive to a determination that the cached transaction identifier is equivalent to the authentication information, for passing the request with the cached transaction identifier in the request to an application.

14. The computer program product of claim 13, wherein computer-executable instructions responsive to a determination the requestor authenticated further comprises:

computer-executable instructions, stored on at least one of the one or more storage devices, for inserting the cached transaction identifier in the request.

15. The computer program product of claim 13, wherein computer-executable instructions responsive to a determination the requestor is not authenticated further comprise computer-executable instructions, stored on at least one of the one or more storage devices, for raising an authentication error, and computer-executable instructions, stored on at least one of the one or more storage devices, for notifying the requestor; and computer-executable instructions for raising an invalid transaction identifier error; and computer-executable instructions for notifying the requestor.

16. The computer program product of claim 13, wherein computer-executable instructions for inserting the cached transaction identifier in the request further comprises computer-executable instructions for one of:

computer-executable instructions, stored on at least one of the one or more storage devices, for intercepting the request, inserting the cached transaction identifier into the request, forwarding of the request to the application by one of a reverse proxy server and a web server security plug-in; and computer-executable instructions, stored on at least one of the one or more storage devices for redirecting the request to the application, intercepting the request, inserting the cached transaction identifier into the request; and forwarding of the request to the application by the security server.

17. The computer program product of claim 13, wherein the request is associated with a transaction having the transaction identifier in a user session, and further comprising:

computer-executable instructions, stored on at least one of the one or more storage devices, responsive to the start of a subsequent transaction in the user session, said subsequent transaction causing any request using the cached transaction identifier to fail; and computer-executable instructions, stored on at least one of the one or more storage devices, responsive to the attempted use of the cached transaction identifier failing, for authenticating the subsequent transaction without use of the cached transaction identifier.

18. An apparatus for transaction authorization within a security service, the apparatus comprising:

a reverse proxy server, for receiving requests from a requestor for a transaction, the reverse proxy server comprising a security plug-in in a web server implementing a security service;

an authentication service in communication with the reverse proxy server, wherein the authentication service authenticates a user;

a security service in communication with the reverse proxy server, wherein the security service intercepts the request and redirects the request for authentication;

an application in communication with the reverse proxy server, wherein the application generates and uses a transaction identifier; and a cache memory, in communication with the security service, that stores the transaction identifier, wherein the transaction identifier is used by the security service and authentication service to authenticate the requestor and the transaction, wherein the application places a cached transaction identifier into the authentication request.

19. The apparatus of claim 18, wherein the apparatus is a data processing system.

* * * * *